(12) United States Patent
Feinstein et al.

(10) Patent No.: US 9,409,383 B2
(45) Date of Patent: Aug. 9, 2016

(54) LAYER-SPECIFIC ENERGY DISTRIBUTION DELAMINATION

(75) Inventors: Casey J. Feinstein, San Jose, CA (US);
Silvio Grespan, Shanghai (CN);
Kuo-Hua Sung, Cupertino, CA (US);
John Z. Zhong, Cupertino, CA (US);
Lynn Youngs, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 860 days.

(21) Appl. No.: 12/408,636

(22) Filed: Mar. 20, 2009

(65) Prior Publication Data

US 2010/0154992 A1 Jun. 24, 2010

Related U.S. Application Data

(60) Provisional application No. 61/140,072, filed on Dec. 22, 2008.

(51) Int. Cl.
*B29C 63/00* (2006.01)
*B32B 43/00* (2006.01)
(Continued)

(52) U.S. Cl.
CPC .............. *B32B 43/006* (2013.01); *B23K 26/00* (2013.01); *B23K 26/0054* (2013.01);
(Continued)

(58) Field of Classification Search
CPC .... B32B 7/06; B32B 43/00; B32B 2310/022; B32B 2310/028; B32B 2310/0806; B32B 2310/0825; B32B 2310/0843; B32B 2310/0862; B32B 38/0004; B32B 2038/045; B32B 38/10; B32B 38/16; B26D 7/086; B26D 7/10; B26D 2001/0013; B26D 2001/006; B26D 1/547; B26D 3/28; B26D 3/282; G02F 1/1309; G02F 1/13338; G02F 1/133305; G02F 1/133308; B23K 26/00; B23K 26/0054; B23K 26/0063; B23K 26/06; B23K 26/0604; B23K 26/50; B23K 26/57; B23K 26/0608; B23K 26/0648
USPC ......... 156/701, 711, 712, 714, 717, 752, 753, 156/761, 762, 765, 710, 750, 919
See application file for complete search history.

(56) References Cited

U.S. PATENT DOCUMENTS 2,976,628 A * 3/1961 Breslow ......................... 40/638
3,090,392 A * 5/1963 Libby ........................... 134/125
(Continued)

FOREIGN PATENT DOCUMENTS

CN 101183285 A * 5/2008
JP 2000-163031 A 6/2000
(Continued)

OTHER PUBLICATIONS

Chen et al., "CN 101183285, machine translation", published May 21, 2008.*
(Continued)

*Primary Examiner* — Alex Efta
(74) *Attorney, Agent, or Firm* — Brownstein Hyatt Farber Schreck, LLP

(57) ABSTRACT

Delamination of a laminated multilayer stack is provided by generating a layer-specific energy distribution in the stack during delamination. A localized energy transferrer can generate localized heating, cooling heating, cooling, or other form of energy absorption or transmission, in a bonding layer of a multilayer stack. Localized energy transfer can include thermal energy transfer, such as heating and/or cooling, acoustic energy transfer, such as applying ultrasonic energy, electromagnetic energy transfer, such as applying laser light, directed microwaves, etc. Localized energy transfer can generate a layer-specific energy distribution that can weaken the bonding layer while reducing damage to other layers of the stack.

29 Claims, 14 Drawing Sheets

(51) Int. Cl.

| | | |
|---|---|---|
| *B26D 7/10* | (2006.01) | |
| *B26D 1/547* | (2006.01) | |
| *B26D 3/28* | (2006.01) | |
| *G02F 1/13* | (2006.01) | |
| *G02F 1/1333* | (2006.01) | |
| *G06F 3/0354* | (2013.01) | |
| *B32B 7/12* | (2006.01) | |
| *B32B 37/16* | (2006.01) | |
| *B32B 38/16* | (2006.01) | |
| *B23K 26/00* | (2014.01) | |
| *B23K 26/06* | (2014.01) | |
| *B32B 38/00* | (2006.01) | |
| *B26D 7/08* | (2006.01) | |
| *B26D 1/00* | (2006.01) | |
| *B32B 37/18* | (2006.01) | |
| *B32B 38/04* | (2006.01) | |
| *B32B 37/12* | (2006.01) | |

(52) U.S. Cl.
CPC ............ *B23K 26/0063* (2013.01); *B23K 26/06* (2013.01); *B23K 26/0604* (2013.01); *B26D 1/547* (2013.01); *B26D 3/28* (2013.01); *B26D 7/10* (2013.01); *B32B 7/12* (2013.01); *B32B 37/16* (2013.01); *B32B 38/0004* (2013.01); *B32B 38/16* (2013.01); *G02F 1/1309* (2013.01); *G02F 1/13338* (2013.01); *G02F 1/133308* (2013.01); *G06F 3/03547* (2013.01); *B26D 3/282* (2013.01); *B26D 7/086* (2013.01); *B26D 2001/006* (2013.01); *B26D 2001/0013* (2013.01); *B32B 37/12* (2013.01); *B32B 37/18* (2013.01); *B32B 2038/045* (2013.01); *B32B 2310/022* (2013.01); *B32B 2310/028* (2013.01); *B32B 2310/0806* (2013.01); *B32B 2310/0825* (2013.01); *B32B 2310/0843* (2013.01); *B32B 2310/0862* (2013.01); *B32B 2457/20* (2013.01); *G06F 2200/1634* (2013.01); *G06F 2200/1635* (2013.01); *Y10T 156/1153* (2015.01); *Y10T 156/1158* (2015.01); *Y10T 156/1184* (2015.01); *Y10T 156/1911* (2015.01); *Y10T 156/1917* (2015.01); *Y10T 156/1967* (2015.01)

(56) References Cited

U.S. PATENT DOCUMENTS

| | | | |
|---|---|---|---|
| 3,351,515 A * | 11/1967 | Muttera, Jr. .................... | 428/346 |
| 3,936,567 A * | 2/1976 | Vesely ........................... | 428/325 |
| 5,423,931 A * | 6/1995 | Inoue et al. ..................... | 156/94 |
| 5,483,261 A | 1/1996 | Yasutake | |
| 5,488,204 A | 1/1996 | Mead et al. | |
| 5,825,352 A | 10/1998 | Bisset et al. | |
| 5,835,079 A | 11/1998 | Shieh | |
| 5,880,411 A | 3/1999 | Gillespie et al. | |
| 5,938,882 A * | 8/1999 | Bryant et al. .................. | 156/701 |
| 6,188,391 B1 | 2/2001 | Seely et al. | |
| 6,310,610 B1 | 10/2001 | Beaton et al. | |
| 6,323,846 B1 | 11/2001 | Westerman et al. | |
| 6,383,329 B1 * | 5/2002 | Agarwala et al. ............. | 156/706 |
| 6,534,383 B1 * | 3/2003 | Iwane et al. ................... | 438/458 |
| 6,690,387 B2 | 2/2004 | Zimmerman et al. | |
| 7,015,894 B2 | 3/2006 | Morohoshi | |
| 7,184,064 B2 | 2/2007 | Zimmerman et al. | |
| 7,663,607 B2 | 2/2010 | Hotelling et al. | |
| 8,118,075 B2 * | 2/2012 | Sampica ................. | B26D 1/547 156/711 |
| 2002/0014465 A1 * | 2/2002 | Chung ........................ | 211/126.1 |
| 2002/0088556 A1 * | 7/2002 | De et al. ......................... | 156/584 |
| 2003/0121601 A1 * | 7/2003 | Tajima ..................... | G09F 7/18 156/254 |
| 2003/0232192 A1 * | 12/2003 | Kishioka et al. .............. | 428/354 |
| 2004/0259332 A1 * | 12/2004 | Fukuoka et al. .............. | 438/464 |
| 2004/0263481 A1 * | 12/2004 | Nishikawa ............ | G06F 1/1601 345/173 |
| 2005/0281101 A1 * | 12/2005 | Bruland et al. ............... | 365/200 |
| 2006/0026521 A1 | 2/2006 | Hotelling et al. | |
| 2006/0097991 A1 | 5/2006 | Hotelling et al. | |
| 2006/0197260 A1 * | 9/2006 | Yoshikawa et al. ........... | 264/482 |
| 2006/0197753 A1 | 9/2006 | Hotelling | |
| 2007/0151088 A1 * | 7/2007 | Suzuki et al. ................. | 29/426.1 |

FOREIGN PATENT DOCUMENTS

| | | | |
|---|---|---|---|
| JP | 2001075494 A | * | 3/2001 |
| JP | 2002-342033 A | | 11/2002 |

OTHER PUBLICATIONS

CN 101183285, machine translation, published May 21, 2008.*

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

* cited by examiner

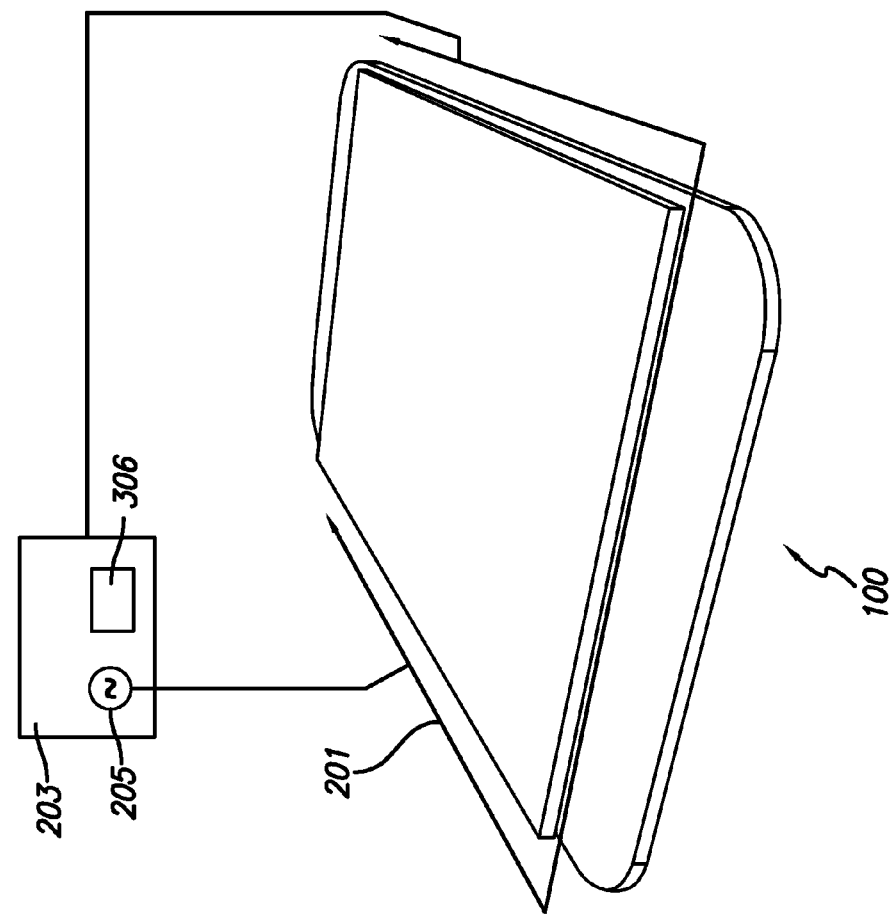
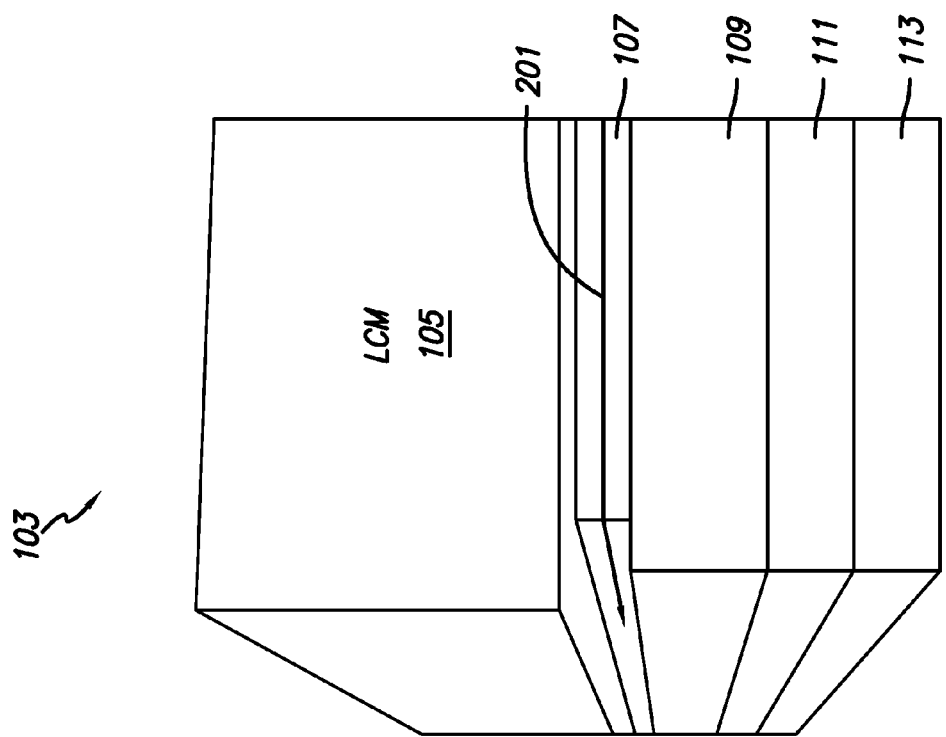

LAYER-SPECIFIC ENERGY DISTRIBUTION DELAMINATION

This application claims the benefit of U.S. Provisional Application No. 61/140,072, filed Dec. 22, 2008, the contents of which are incorporated by reference herein.

FIELD OF THE INVENTION

This relates generally to delaminating a laminated multilayer stack, and in particular, to weakening a bonding layer of a laminated multilayer stack by generating a layer-specific energy distribution in the stack during delamination.

BACKGROUND OF THE INVENTION

Multilayer laminates have found use in a wide variety of applications, from exploratory space vehicles to consumer products. Many of these applications rely on the exceptional strength and structural integrity that multilayer laminates can provide.

Because of the strength and structural integrity of multilayer laminates, conventional delamination processes typically result in the destruction or degradation of one or more layers of a laminate. One conventional delamination process, for example, is directed to multilayer laminates in which layers are bonded together with an adhesive layer. In this delamination process, the multilayer laminate structure is heated in an oven until the adhesive layer softens. Once the adhesive has been sufficiently heated, the adhesive becomes soft enough for the surrounding layers to be separated by mechanical means.

In some applications, the temperature increase during the delamination process does not significantly degrade the layers surrounding the adhesive. However, in other applications the temperature increase may cause enough damage to the surrounding layers to render the layers partially or completely unusable. Delamination by heating a multilayer laminate stack used in a typical LCD touch screen application, for example, is likely to destroy the touch screen's LCD functionality, although the resulting delaminated layers might still be usable in some types of failure analysis.

SUMMARY OF THE INVENTION

This relates to delaminating a laminated multilayer stack, and in particular, to weakening a bonding layer of a laminated multilayer stack by generating a layer-specific energy distribution in the stack during delamination. A layer-specific energy distribution can result from localized heating, cooling, or other form of energy absorption or transmission, in a bonding layer of a multilayer stack. A localized heating, for example, of a bonding layer can result in an increase of the temperature of the bonding layer to exceed a threshold temperature at which the bonding layer is weakened. Weakening the bonding layer can allow a faster and more efficient delamination process to separate layers held together by the bonding layer. Limiting the temperature increase, in this example, to the bonding layer can reduce or eliminate damage to other layers of the stack.

BRIEF DESCRIPTION OF THE DRAWINGS

FIGS. 2A and 2B illustrate an example delamination apparatus and process according to embodiments of the invention.

DETAILED DESCRIPTION

In the following description, reference is made to the accompanying drawings which form a part hereof, and in which it is shown by way of illustration specific example embodiments in which the invention can be practiced. It is to be understood that other embodiments can be used and structural changes can be made without departing from the scope of the invention.

This relates to delaminating a laminated multilayer stack, and in particular, to weakening a bonding layer of a laminated multilayer stack by generating a layer-specific energy distribution in the stack during delamination. A layer-specific energy distribution can result from localized heating, cooling, or other form of energy absorption or transmission, in a bonding layer of a multilayer stack. A localized heating, for example, of a bonding layer can result in an increase of the temperature of the bonding layer to exceed a threshold temperature at which the bonding layer is weakened. Weakening the bonding layer can allow a faster and more efficient delamination process to separate layers held together by the bonding layer. Limiting the temperature increase, in this example, to the bonding layer can reduce or eliminate damage to other layers of the stack.

Although embodiments of the invention may be described and illustrated herein in terms of laminated multilayer stacks for capacitive touch screens, it should be understood that embodiments of this invention are not so limited, but are applicable to other laminated stacks in which a suitable energy distribution can be generated to weaken a bonding layer.

Figure 1:
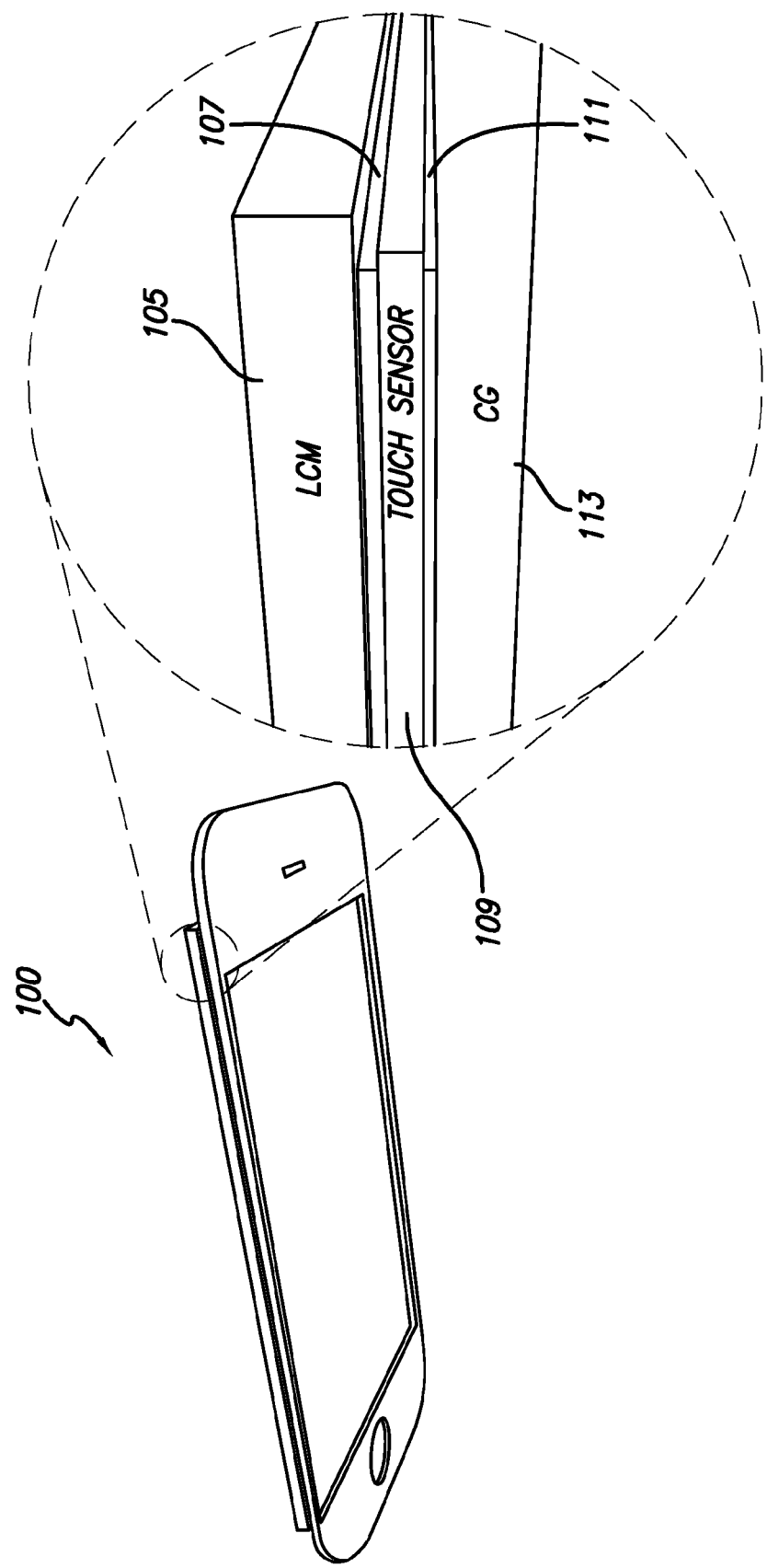
FIG. 1 illustrates an example touch screen 100 that may be processed according to embodiments of the invention.

FIG. 1 illustrates an example touch screen 100 that may be processed according to embodiments of the invention. FIG. 1 includes an enlarged view of a portion of touch screen 100 showing details of a laminated multilayer stack 103 of the touch screen. Stack 103 includes a liquid crystal module (LCM) layer 105, a pressure sensitive adhesive layer (PSA) 107, a touch sensor (TS) layer 109, a PSA layer 111, and a cover glass (CG) layer 113. Although laminated multilayer stack 103 is shown as a 5-layer stack, one skilled in the art will understand that embodiments of the invention would apply to stacks having more or fewer layers.

FIGS. 2A and 2B illustrate an example delamination apparatus and process according to embodiments of the invention. FIG. 2A shows a side view of multilayer stack 103. In the delamination process, a cutting wire 201 is heated and pressed into an exposed surface of PSA layer 107. The thermal energy of cutting wire 201 heats the portion of PSA layer 107 near the contact area and softens the PSA material, making it easier for the cutting wire to cut through the PSA layer. The arrowed line in FIG. 2 shows the cutting direction that cutting wire 201 is drawn through PSA layer 107 as it concurrently softens and cuts the PSA material. Thus, the heated cutting wire 201 is a localized energy transferrer, and in particular, a localized thermal energy transferrer because the application of thermal energy is localized to a portion of PSA layer 107. In this way, for example, temperature increases of the other layers of stack 103 (such as LCM layer 105, TS layer 109, etc.) may be restricted. The application of heated cutting wire 201 generates a layer-specific distribution of thermal energy among the layers of multilayer stack 103. The particular distribution of thermal energy generated in stack 103 can be modified by adjusting design parameters such as the dimensions and material properties (e.g., thermal conductivities) of the layers, the temperature and shape of the mechanical cutting element (e.g., wire, straight-edge blade, triangular blade), the speed of the cutting movement, the ambient temperature, etc.

Additional heating/cooling can be provided to further shape the energy distribution. For example, heat sinks or other cooling mechanisms could be attached to the outer surfaces of the multilayer stack to help draw heat from the outer layers of the stack more quickly, creating a steeper gradient of thermal energy between the inner and outer layers. The temperature of the cutting element can be varied as a function of time to further affect the energy distribution. For example, the heating source of the cutting element can be switched on and off periodically, allowing built-up heat in the layers to dissipate in between the "on" cycles.

The design parameters can be adjusted so that the distribution of thermal energy generated in the layers of the multilayer laminate stack cause the temperature of a bonding layer to exceed a threshold temperature at which the bonding layer weakens, while maintaining the other layers below temperatures at which damage would occur.

FIG. 2B shows a perspective view of the example embodiment, including touch screen 100, heated cutting wire 201, and a controller 203. Controller 203 controls the temperature of wire 201 and the cutting motion of cutting wire 201 (shown by the arrowed lines). Controller 203 includes a heating mechanism to heat cutting wire 201. In this example, the heating mechanism is an electrical current source 205 that supplies an electrical current to cutting wire 201. The electrical current is controlled to heat cutting wire 201 to the desired temperature for the particular delamination process. Other heating mechanisms could be used, for example, a heater that supplies thermal energy to cutting wire 201. Controller 203 also includes a motor 206 that operates to move cutting wire 201 in a cutting motion (as shown by the arrowed lines) through PSA layer 107.

Controller 203 can control motor 206 to provide a cutting motion that works efficiently in conjunction with the heating provided by current source 205. For example, at the start of the delamination process, motor 206 positions cutting wire 201 at a starting surface of PSA layer 107, and current source 205 begins supplying an electrical current to the cutting wire. After allowing a predetermined time period for the current to heat cutting wire 201, and the heated cutting wire to heat PSA layer 107 to above the threshold temperature, motor 206 begins the cutting motion through PSA layer. The rate of motion is controlled to be slow enough to allow sufficient heating of the PSA material near cutting wire so that the PSA material is softened prior to being cut by the wire, and the motion of the wire is fast enough to reduce or minimize temperature increases in the surrounding layers. The motion may be, for example, continuous, stepped, at a constant rate, at a variable rate, etc. In some embodiments, controller 203 can take into account various system parameters, such as the material properties of the PSA layer, the characteristics of the heated cutting wire, e.g., the wire's thermal properties, size and shape of the wire, the operating temperature of the wire, etc. In this way, controller 203 may control the cutting motion to provide more efficient cutting. In some embodiments, cutting wire 201 may be moved through PSA layer 107 using other mechanisms. For example, touch screen 100 may be fixed to a movable chuck, and cutting wire 201 may remain stationary while the movable chuck moves the touch screen such that PSA layer 107 is heated and cut by the cutting wire.

One potential advantage of generating localized heating of PSA layer 107 is highlighted by the PSA layer's proximity to LCM layer 105, as shown in FIG. 2A. Specifically, the liquid crystal contained in liquid crystal modules such as LCM layer 105 typically begins to degrade at a temperature of approximately 100° C. However, a temperature greater than 100° C. is required to soften many PSA materials. In this example, the delamination process of the present embodiment can potentially allow a much greater variety of PSA materials to be used for PSA layer 105 while still allowing heating to be used in a nondestructive delamination process of touch screen 100.

Figure 3B:
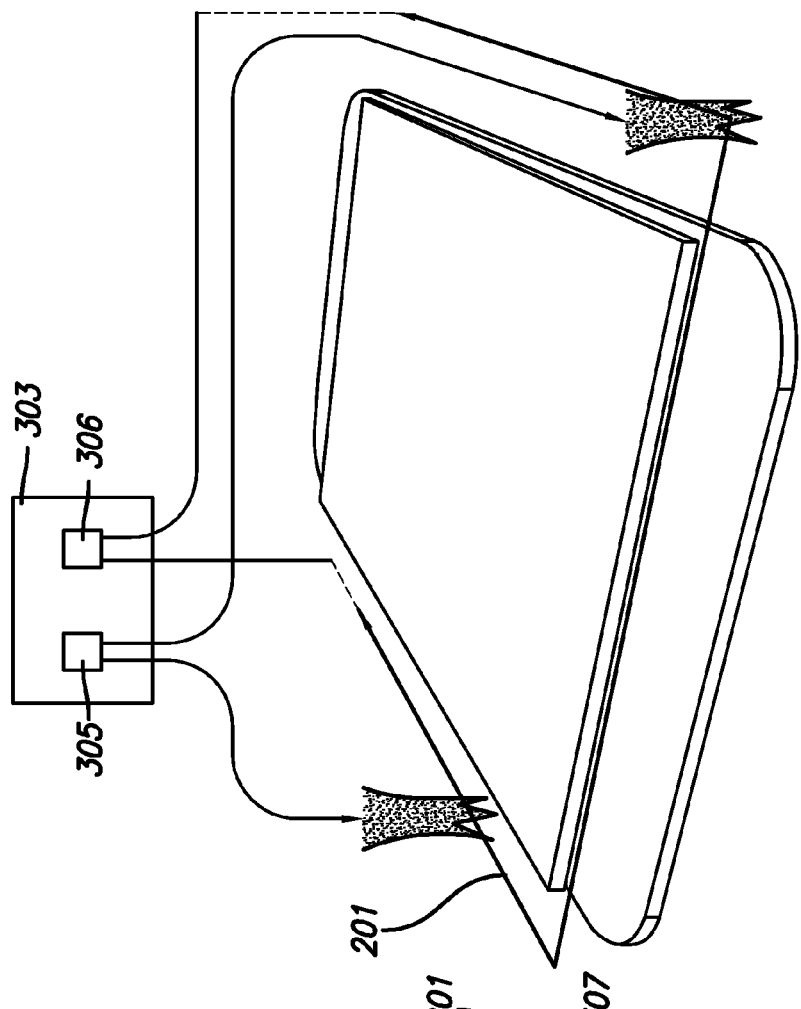
FIGS. 3A and 3B show another example delamination apparatus and process according to embodiments of the invention.
Figure 3A:
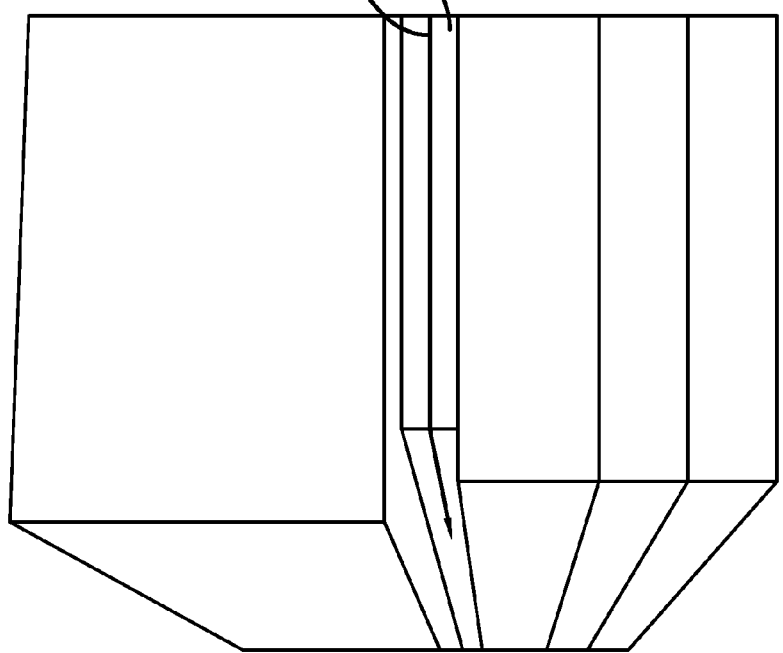

FIGS. 3A and 3B show another example delamination apparatus and process according to embodiments of the invention. The example embodiment shown in these figures is similar to the embodiment shown in FIGS. 2A and 2B, with the exception that cooling (instead of heating) is applied to the PSA material in order to weaken the material during delamination. In this regard, FIGS. 3A and 3B include a PSA layer 307 that weakens below a threshold temperature. A controller 303 includes a coolant, in this case a liquid nitrogen supply 305, which provides a cooling mechanism to cool cutting wire 201 to a temperature below the threshold temperature of the PSA material. More specifically, liquid nitrogen supply 305 supplies two flows of liquid nitrogen to portions of cutting wire 201 close to the wire's cutting surface. Other cooling mechanisms could be used, for example, a condenser-type refrigeration unit. Like embodiments in which cutting wire 201 is heated, the cooled cutting wire 201 is a localized energy transferrer because the application of thermal energy, in this case transferring thermal energy out of PSA layer 107, is localized to a portion of the PSA layer.

Controller 303 includes a motor 306 to move cutting wire 201 and a cutting motion through PSA layer 307, similar to motor 206 described above. The exact cutting motion provided by motor 306 may be different than the cutting motion of motor 206 due to, for example, the differences in the material properties of the PSA layers, the different effects of heating and cooling, etc.

Figure 4:
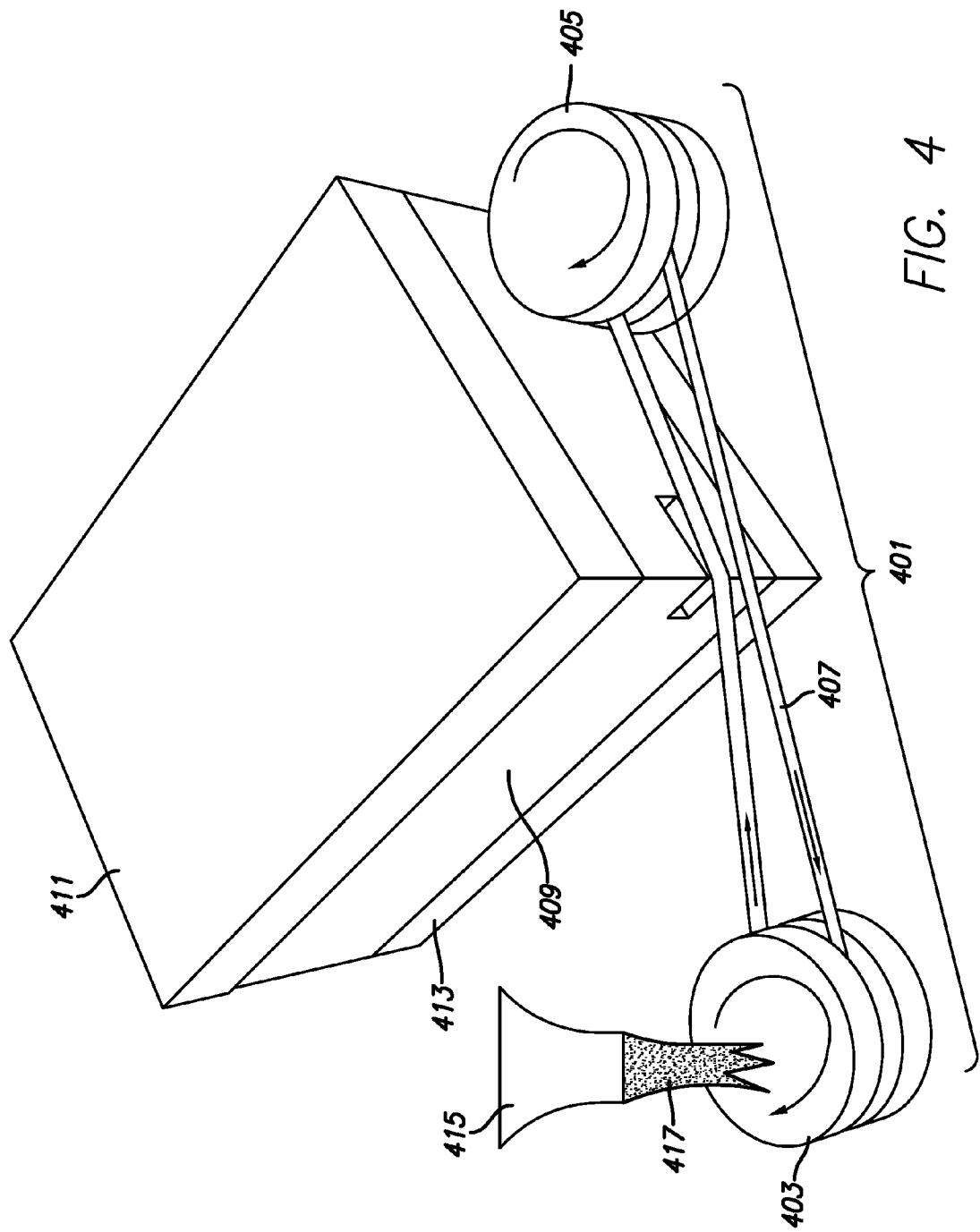
FIG. 4 illustrates another example delamination apparatus and process according to embodiments of the invention.

FIG. 4 illustrates another example delamination apparatus and process according to embodiments of the invention. FIG. 4 shows a localized energy transferrer that is a pulley bandsaw 401, including pulleys 403 and 405, and a cutting wire 407. A motor (not shown) turns pulleys 403 and 405 to draw cutting wire 407 across a cutting surface of a PSA layer 409 during the delamination process to separate an upper layer 411 and a lower layer 413. As pulleys 403 and 405 are turned, the pulleys are moved in a cutting motion toward PSA layer 409, such that cutting wire 407 cuts through the PSA layer. During the delamination process, cutting wire 407 is cooled below a threshold temperature at which PSA layer 409 is weakened. The cooling mechanism can include, for example, a nozzle 415 applies a coolant 417 to cool pulley 403, which in turn cools cutting wire 407. The cooling mechanism could also include additional nozzles to apply coolant to pulley 405 and/or to cutting wire 407. Other cooling mechanisms could be used, for example, a condenser-type refrigeration unit.

In other embodiments, cutting wire 407 can be heated, for example, by heating one or more of pulleys 403 and 405. As in the example embodiments of FIGS. 2A-B and 3A-B, the choice of heating or cooling cutting wire 407 can depend on the PSA material to be cut during the delamination process. Similarly, the type of cutting motion can vary depending on factors such as the type of mechanical separating mechanism used (e.g., wire, blade, etc.), the material properties of the layers, etc.

Figure 5:
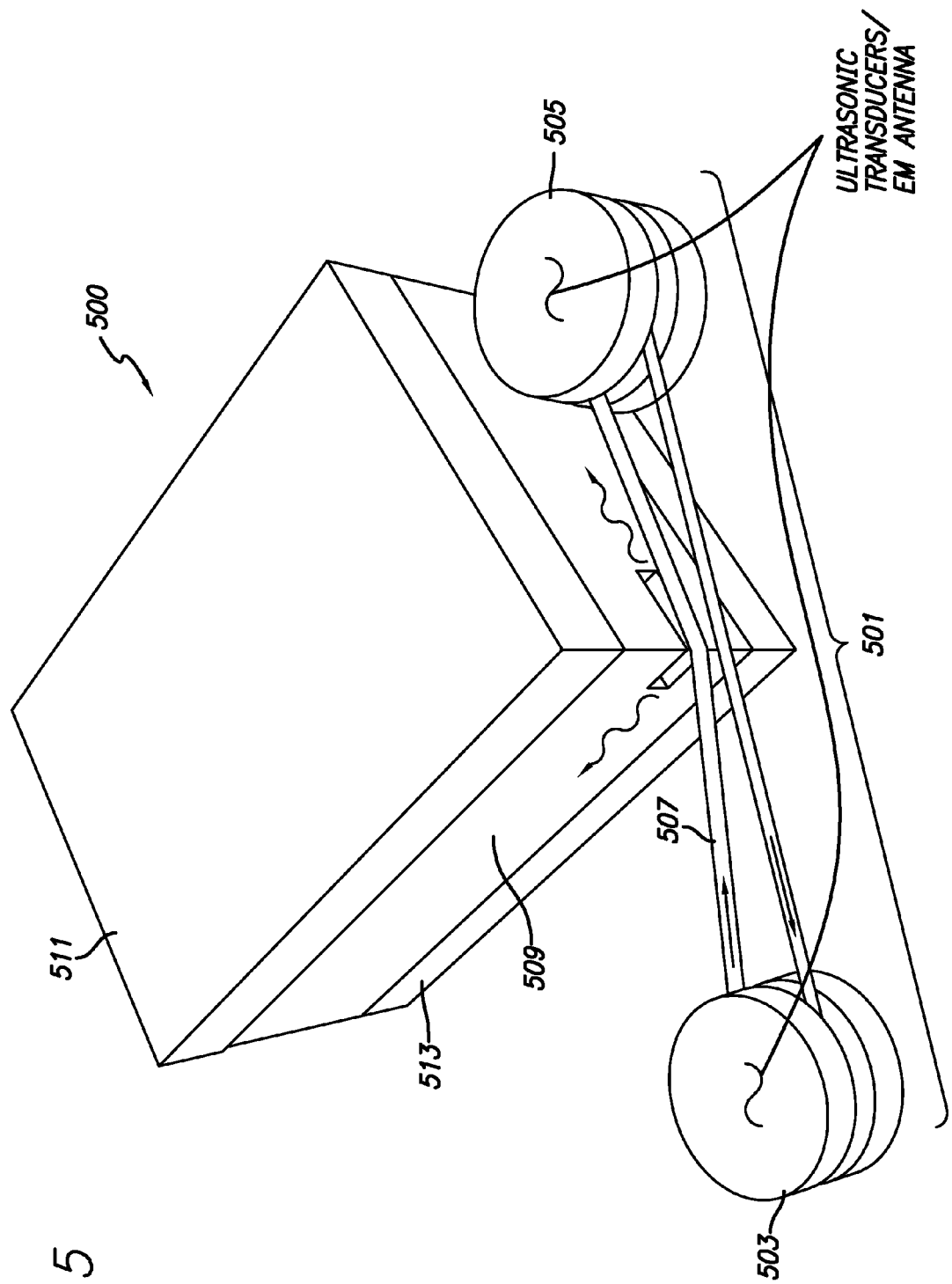
FIG. 5 shows another example embodiment using a pulley bandsaw to generate a layer-specific energy distribution in a multilayer laminate.

FIG. 5 shows another example embodiment using a pulley bandsaw to generate a layer-specific energy distribution in a multilayer laminate. In this embodiment, energy distribution is localized in a bonding layer in part because the bonding layer selectively absorbs the particular energy transmitted by the cutting wire of the pulley bandsaw. Different types of energy may be transmitted by the cutting wire, for example, acoustic energy (e.g., ultrasound, mechanical vibrations, etc.) and electromagnetic (EM) energy (e.g., radio waves, microwaves, etc.). FIG. 5 shows a pulley bandsaw 501 including pulleys 503 and 505, and a cutting wire 507. As in the previous embodiment, pulleys 501 and 503 rotate to draw cutting wire 507 across a cutting surface of a bonding layer of a multilayer stack during the delamination process. In one example embodiment, each of pulleys 503 of 505 also comprises an ultrasonic transducer (not shown). In other embodiments, only one of the pulleys may comprise an ultrasonic transducer. The ultrasonic transducers transmit ultrasonic energy to cutting wire 507 as the cutting wire is driven by the spinning pulleys during the delamination process. Bandsaw pulley 501 is moved toward multilayer stack 500 and cutting wire 507 is brought into contact with a PSA layer 509 of a multilayer laminated stack 500. In addition to the mechanical cutting of spinning cutting wire 507, the cutting wire also transfers the ultrasonic energy from the ultrasonic transducers to PSA layer 509. In this way, pulley bandsaw 501 can be a localized acoustic energy transferrer because the application of ultrasonic energy may be localized in PSA layer 509, so that the PSA layer may be weakened while reducing or minimizing damage to other layers in stack 500, such as an upper layer 511 and a lower layer 513. In other words, the delamination process generates a layer-specific distribution of ultrasonic energy among the layers of stack 500, such that the bonding layer can be weakened due to the higher concentration of energy in the bonding layer.

In other embodiments, the cutting wire can be used as a localized EM energy transferrer by transmitting EM energy, such as radio waves, microwaves, etc., into the bonding layer. Referring again to FIG. 5, pulleys 503 and 505 can comprise EM transmitters (not shown), that use cutting wire 507 as an antennae to transmit EM energy into PSA layer 509.

In some embodiments, the material used for the bonding layer can be specifically chosen or formulated to enhance the effect of the type of energy imparted to the bonding layer during delamination. A specially formulated PSA material, for example, that chemically degrades or releases under the influence of the particular type of energy might be used.

Figure 6:
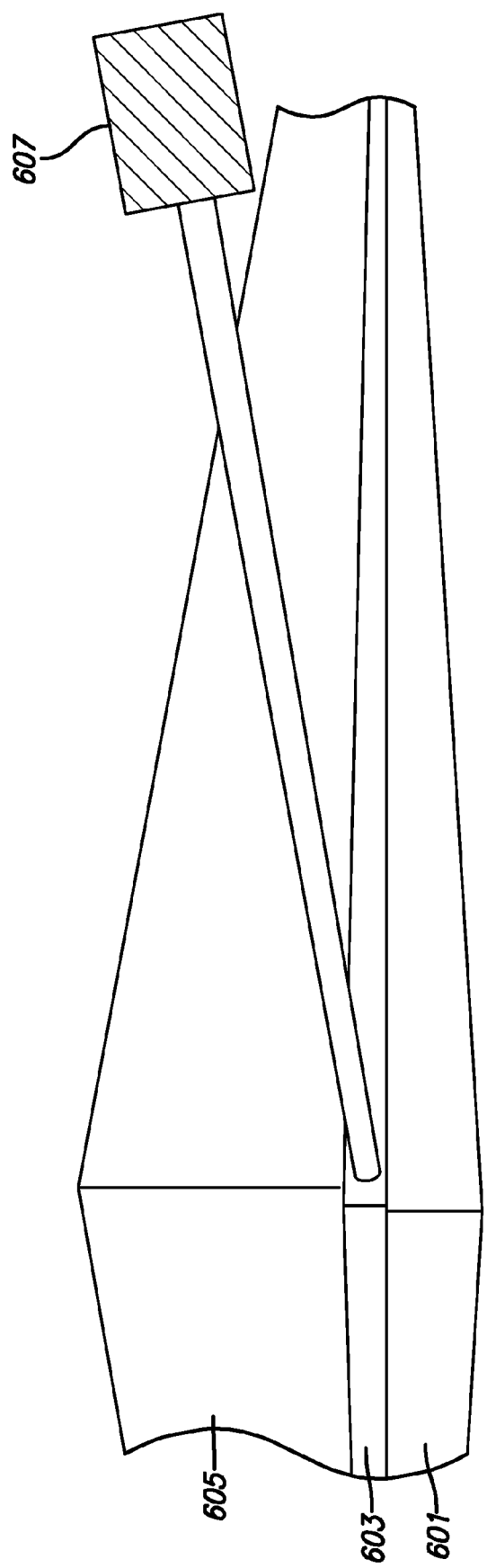
FIG. 6 illustrates another example delamination apparatus and process according to embodiments of the invention.

FIG. 6 illustrates another example delamination apparatus and process according to embodiments of the invention. FIG. 6 shows a multilayer laminated stack 600 including a lower layer 601, a PSA layer 603, and an upper layer 605. A laser 607 is a localized EM energy transferrer that supplies a localized application of energy to generate a layer-specific energy distribution among the layers of stack 600. Laser 607 has a wavelength that is at least partially absorbed by PSA layer 603. The light from laser 607 is directed to an exposed surface of PSA layer 603 to heat the PSA layer locally at the exposed surface during a delamination process. Laser 607 can be controlled by a controller (not shown) to apply the laser light in a variety of ways, for example, irradiating a single point on the surface of PSA layer 603 (point scanning), scanning the laser along a line on the surface (line scanning), scanning the laser along an arc around the PSA layer, etc., to locally heat the PSA layer.

In the example embodiment shown in FIG. 6, PSA layer 603 is removed through ablation and/or evaporation caused by the laser light itself. In other words, the laser light serves both as an energy delivery mechanism and as a mechanical separator. In other embodiments, the laser light can be used in conjunction with a mechanical separator, such as a wire, blade, etc. (not shown), for the delamination process. In these embodiments, the laser light serves a heat source only, while the mechanical separator operates to separate layers (delaminate) by cutting, breaking, removing, etc., a bonding layer between the two layers to be separated.

Figure 7:
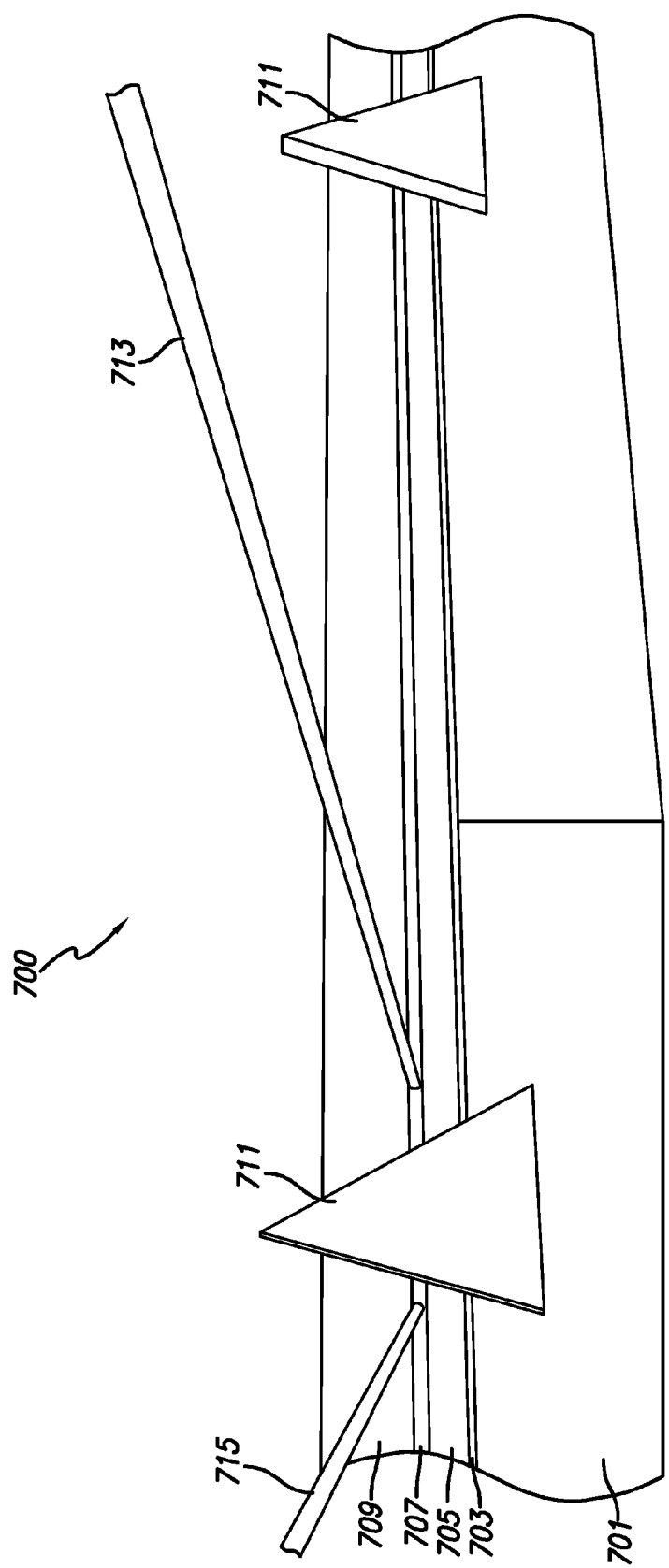
FIG. 7 illustrates another example delamination apparatus and process according to embodiments of the invention.

FIG. 7 illustrates another example delamination apparatus and process according to embodiments of the invention. In particular, FIG. 7 shows a modification of the example embodiment of FIG. 6, in which obstacles blocking access to a bonding layer may be circumvented by scanning the laser (not shown) around the obstacles and/or using multiple lasers to avoid the obstacles. FIG. 7 shows a side view of an example multilayer laminated stack 700 that includes a CG layer 701, a PSA layer 703, a TS layer 705, a PSA layer 707, and an LCM layer 709. Stack 700 also includes mounting tabs 711 that obstruct a cutting surface of PSA layer 707. In order to help circumvent mounting tabs 711 and to heat PSA layer 707 sufficiently, FIG. 7 shows two laser beams 713 and 715 striking the cutting surface of the PSA layer at angles near an obstacle 711. In some embodiments, a single laser can be used to form laser beams 713 and 715. In this case, laser beams 713 and 715 in FIG. 7 represent two laser beams applied at different times from the single laser. For example, the single laser (not shown) could apply laser beam 713 at a first time, the laser could be moved to a different vantage point, and could apply laser beam 715 from the different vantage point (at a time later than the first time). In another example embodiment, the single laser could apply laser beam 713 through a first beam path of an optical system (not shown) at a first time, the optical system could be adjusted for a second beam path, and the laser could apply laser beam 715 through the second path (at a time later than the first time).

In other embodiments, two or more lasers may be used to apply laser beams 713 and 715. Using multiple lasers may provide some benefits. For example, it might be possible to eliminate the requirement for an optics system and/or a system to move the laser, or to reduce the complexity and cost of such systems. Another potential benefit is that multiple laser beams could be applied simultaneously, which could allow PSA layer 707 to be heated and ablated, cut, etc., in less time. Reducing the time required to heat PSA layer 707 might also help to reduce the total heat transferred to other layers, which could further help prevent damage to the other layers.

Figure 8:
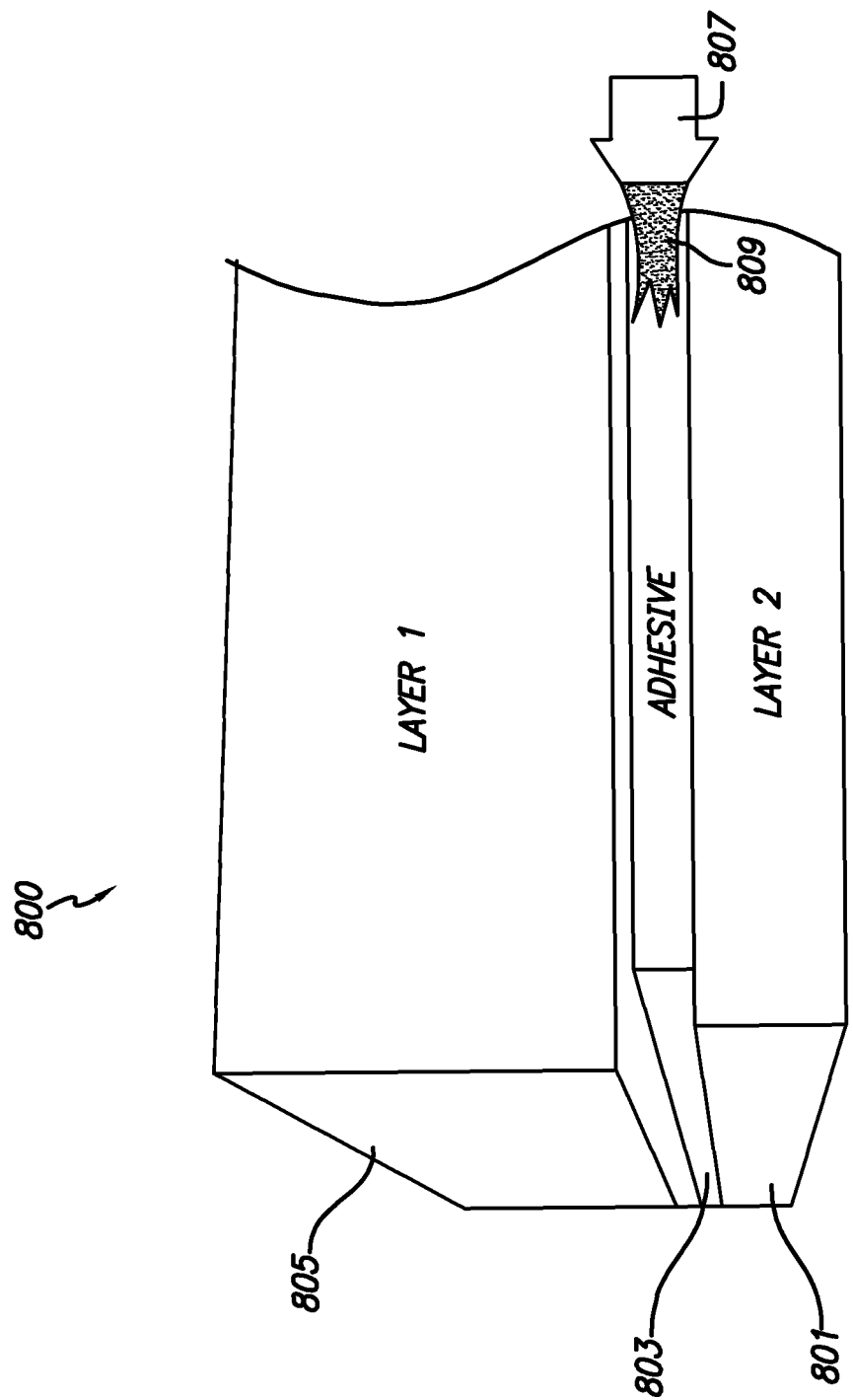
FIG. 8 illustrates another example delamination apparatus and process according to embodiments of the invention.

FIG. 8 illustrates another example delamination apparatus and process according to embodiments of the invention, in which a coolant delivery mechanism sprays a liquid coolant onto a cutting surface of a bonding layer in advance of a mechanical separator that cuts, breaks, etc., the cooled portion of the bonding layer. FIG. 8 shows a multilayer laminated stack 800 including a lower layer 801, a PSA layer 803, and an upper layer 805. A nozzle 807 pulses liquid nitrogen 809 onto a cutting surface of PSA layer 803. When the cutting surface is sufficiently cooled by the pulses of liquid nitrogen 809, a cutting wire (not shown) is advanced through the cooled portion of PSA layer 803. Thus, the system including the cutting wire and nozzle 807 can be a localized energy transferrer.

In the example embodiment of FIG. 8, nozzle 807 pulses liquid nitrogen 809, that is, the nozzle ejects a flow of liquid nitrogen for a (usually brief) period of time, stops the flow for a period of time, and repeats the cycle. Pulsing the flow of liquid nitrogen can allow the temperature of the layers of stack 800 to increase during the periods when no liquid nitrogen is being sprayed. This may help generate a layer-specific energy distribution that can reduce the temperature of PSA layer 803 below the threshold temperature to weaken the layer, while preventing the temperatures of layers 801 and 805 from dropping below damaging levels.

Figure 9:
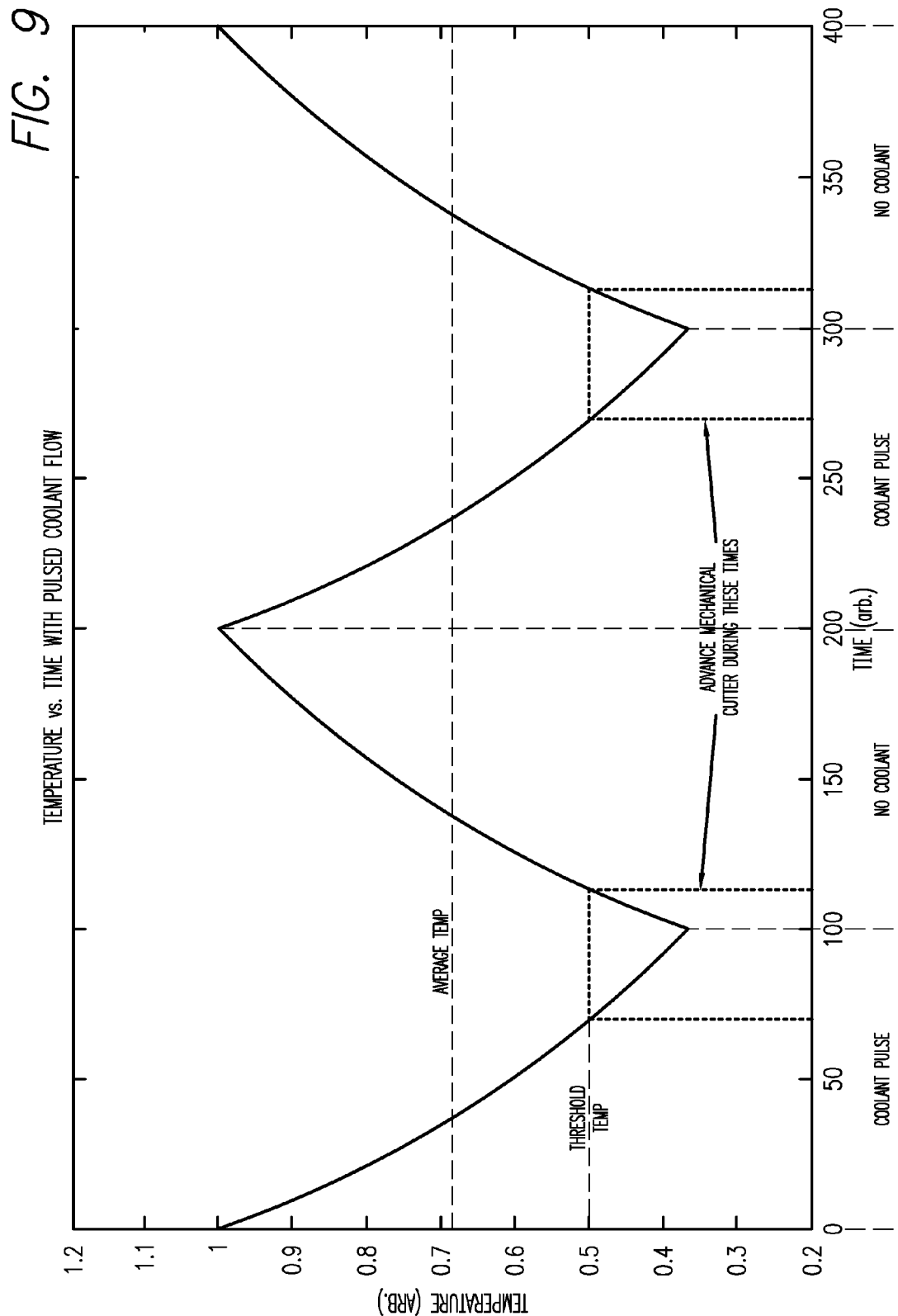
FIG. 9 is a graph showing an example simulation of the temperature of the cutting surface of a pressure sensitive adhesive (PSA) that is cooled with a pulsed coolant flow.

FIG. 9 is a graph showing an example simulation of the temperature of the cutting surface of a PSA that is cooled with a pulsed coolant flow. The y-axis of FIG. 9 shows the temperature (in arbitrary units) of the cutting surface, and the x-axis shows the time (in arbitrary units). The first pulse of coolant is applied during time 0 to 100, no coolant is applied during time 101 to 200, and the cycle is repeated. The threshold temperature of the PSA, below which the PSA begins to weaken, is 0.5. As shown in FIG. 9, the surface temperature of the PSA falls below the threshold temperature of 0.5 only a portion of the time at the end of the cooling pulses and the beginning of the no coolant periods.

FIG. 9 also shows a horizontal line at a temperature of approximately 0.69, which is the average temperature of the localized cooling graph shown in FIG. 9. Because of the distance between the other layers and the localized cooling shown in FIG. 9, the temperatures of the other layers will tend to be close to the average temperature of 0.69 with little fluctuation. Thus, the temperature of the PSA layer in this example can be decreased below the PSA's threshold temperature (for a period of time, as discussed above) while the other layers can be maintained at a significantly higher temperature. In other words, the example delamination process can generate a layer-specific energy distribution that results in a weakening of the bonding layer while reducing damage to other layers.

During the time periods that the temperature of the cutting surface of the PSA is below the threshold, the PSA is weakened, and the system advances the cutting wire through the weakened PSA. When the temperature of the PSA increases above the threshold temperature, the cutting wire is stopped. Thus, pulsing the application of coolant can provide a way to limit temperature decreases in other layers, while still weakening the bonding layer, albeit for a limited period of time. Incremental cutting, breaking, removing, etc. can be used to take advantage of the limited durations that the bonding layer is in a weakened state.

Pulsed application of energy can potential yield another benefit. Specifically, forcing the temperature of the bonding layer to increase and decrease rapidly with the pulsed application of coolant may cause additional strain and/or stress in the bonding layer, which may further weaken the layer.

Figure 10:
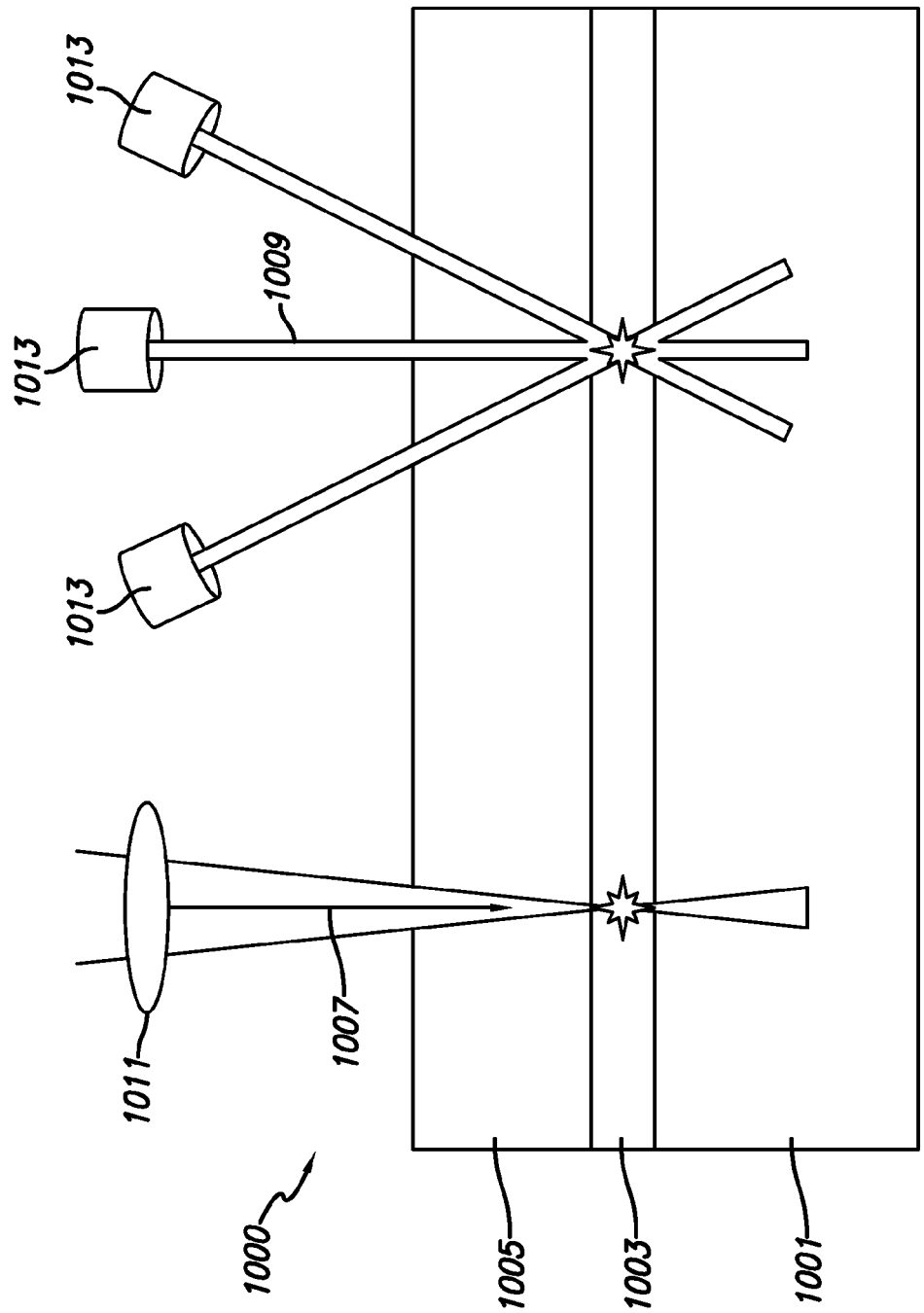
FIG. 10 illustrates another example delamination apparatus and process according to embodiments of the invention.

FIG. 10 illustrates another example delamination apparatus and process according to embodiments of the invention, in which energy absorption in a bonding layer is increased by increasing an energy density of the applied energy. FIG. 10 shows a multilayer laminate stack 1000 including a lower layer 1001, a PSA layer 1003, and an upper layer 1005. FIG. 10 also shows two approaches using a localized energy transferrer to increase energy density in PSA layer 1003. In a first approach, a beam of light 1007 having a wavelength absorbed by PSA layer 1003 is focused by a lens 1011 before being transmitted through the multiple layers of stack 1000. As a result, the portions of light beam 1007 travelling through lower layer 100 and upper layer 1005 are relatively diffuse. Thus, temperature increases in the lower and upper layers can be reduced. On the other hand, the portion of light beam 1007 traveling through PSA layer 1003 is tightly focused, resulting in a greater increase in temperature of the PSA layer.

A second approach shown in FIG. 10 includes three laser beams 1009 (generated by lasers 1013). Laser beams 1009 are aimed by an aiming mechanism (not shown) such that the laser beams penetrate upper layer 1005 and converge in PSA layer 1003. The convergence of laser beams 1009 in PSA layer 1003 increases the energy density in the PSA layer compared to the separate laser beams transmitted though the lower layer 1001 and upper layer 1005.

Figure 11:
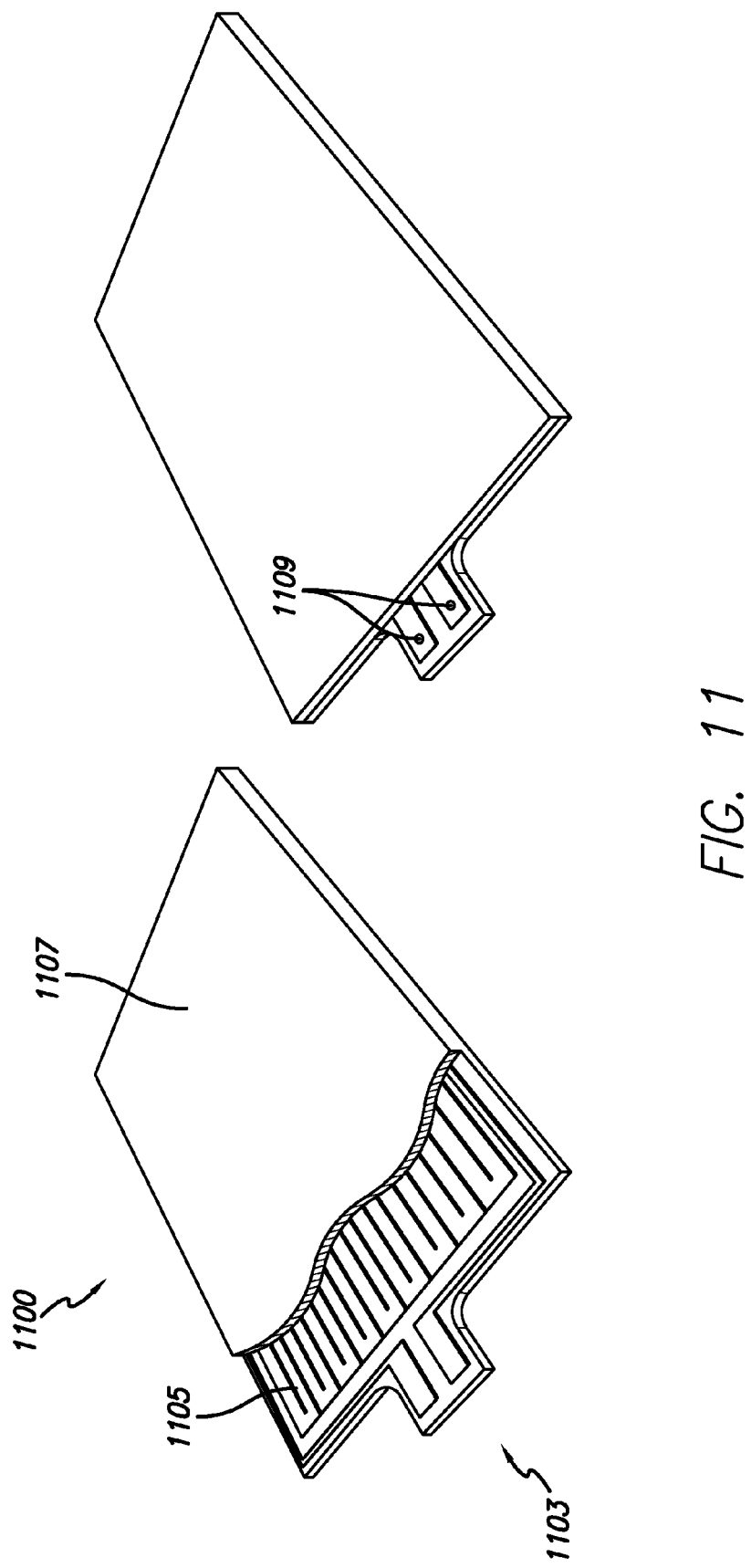
FIG. 11 illustrates an example embedded layer conductive layer in an adhesive stack that can be used in a delamination process according to embodiments of the invention.

FIG. 11 illustrates an example embedded layer conductive layer in an adhesive stack that can be used in a delamination process according to embodiments of the invention. An embedded-conductor stack 1100 includes an upper adhesive layer 1101 and a lower adhesive layer 1103. A localized energy transferrer can be a conductive layer 1105 including conductive traces is embedded between upper layer 1101 and lower layer 1105. Two conductive pads 1109 remain exposed after conductive layer 1105 is embedded. Embedded-conductor stack 1100 can be formed as a bonding layer in a multilayer laminate stack, where the embedded-conductor stack can then be used for generating a layer-specific energy distribution in delamination processes according to embodiments of the invention, some examples of which will now be described.

In one example embodiment, conductive layer 1105 is formed of an electrically conductive material, and one or both of adhesive layers 1103 and 1107 are formed of an adhesive material that weakens above a threshold temperature. If conductive layer 1105 is formed of a transparent conductor, such as indium tin oxide (ITO), embedded-conductor stack 1100 could be formed in the place of one or both of PSA layers 107 and 111 of the laminated stack of touch screen 100, for example. During a delamination process of such a laminated stack, an electrical current is applied to conductive pads 1109. The electrical current causes the conductive traces of conductive layer 1105 to heat up. The current can be controlled to provide localized heating of the adhesive material of embedded-conductor stack 1100 to above the threshold temperature, while limiting the temperature increase of other layers of the laminated stack. A mechanical separation mechanism, such as a cutting wire, blade, etc. can be used to separate the layers by, for example, cutting, breaking, pulling apart, etc., the weakened adhesive.

In another example embodiment, conductive layer 1105 is formed of a thermally conductive material. Like the foregoing example embodiment, a stack 1100 embedded with a thermally conductive layer 1105 may be formed in place of a PSA layer or other adhesive layer in many multilayer laminated stack applications. During a delamination process, conductive pads 1109 can be connected to a heating mechanism, and the conductive traces of conductive layer 1105 can be heated to provide localized heating of the adhesive material of embedded-conductor stack 1100, while limiting the temperature increase of other layers of the laminated stack. In this case, one or both of adhesive layers 1103 and 1107 is formed of an adhesive material that weakens above a threshold temperature. A mechanical separation mechanism, such as a cutting wire, blade, etc. can be used to separate the layers by, for example, cutting, breaking, pulling apart, etc., the weakened adhesive.

In another example embodiment, an embedded-conductor stack 1100 is formed with a thermally conductive layer 1105 as in the foregoing example embodiment. However, in the present embodiment, one or both of adhesive layers 1103 and 1107 is formed of an adhesive that weakens below a threshold temperature. During a delamination process of a multilayer laminated stack including an embedded-conductor stack 1100 of the present embodiment, a cooling mechanism can be applied to conductive pads 1109, and the conductive traces can be cooled to provide localized cooling of the adhesive material of stack 1100, while limiting the temperature increase of other layers of the laminated stack. As in the foregoing embodiments, a mechanical separation mechanism can be used to separate layers at the weakened adhesive.

Figure 12:
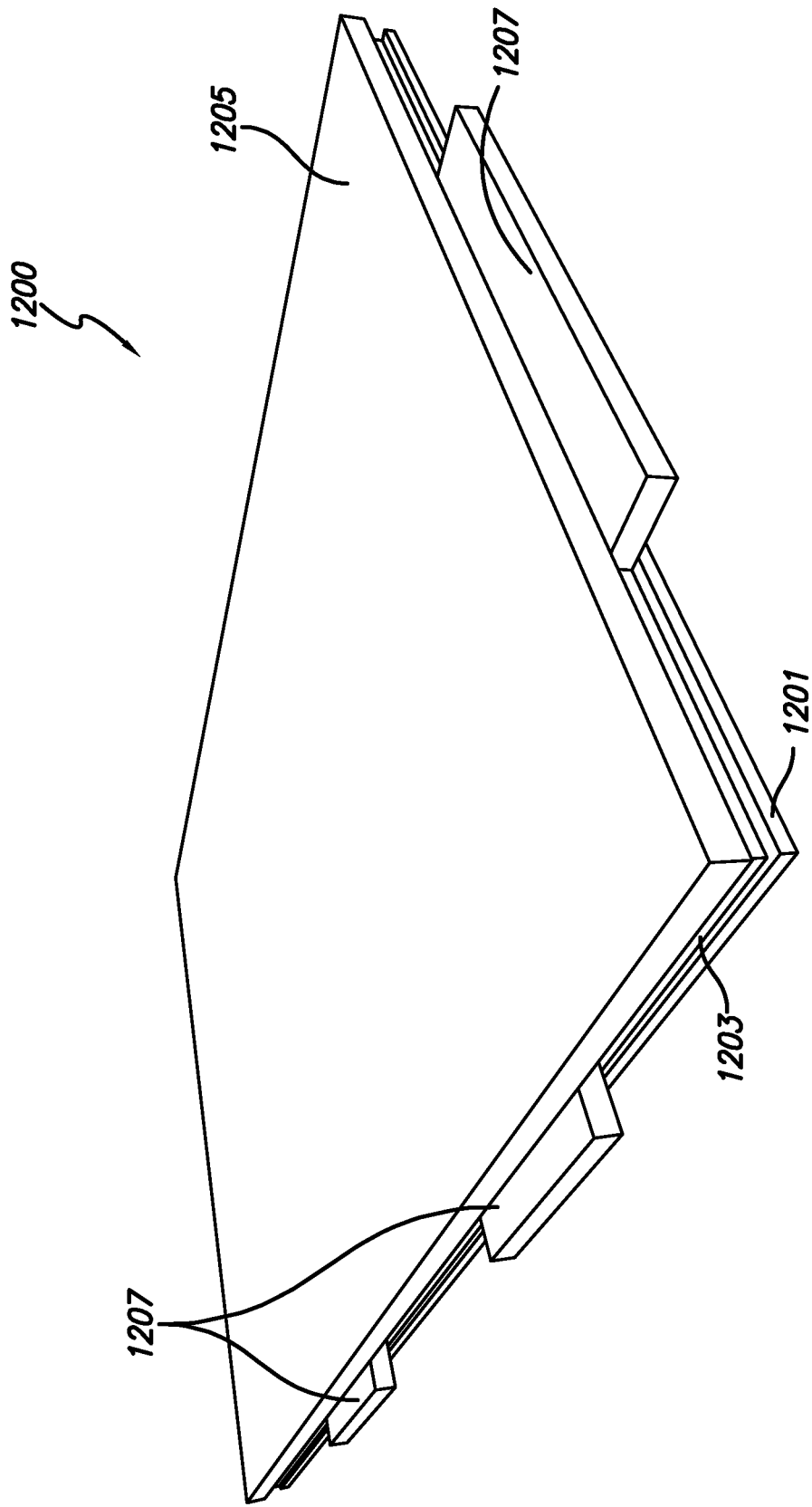
FIG. 12 illustrates an example multilayer laminated stack with extended adhesive tabs according to embodiments of the invention.

FIG. 12 illustrates an example multilayer laminated stack with extended adhesive tabs according to embodiments of the invention. FIG. 12 shows a multilayer laminated stack 1200 including a lower layer 1201, an adhesive layer 1203, and an upper layer 1205. Adhesive layer 1203 is formed of an adhesive material, and portions of the adhesive material extend beyond the ends of lower layer 1201 and upper layer 1205 to form extended tabs 1207 of adhesive material. During a delamination process of stack 1200, extended tabs 1207 can provide additional surface area of adhesive layer 1203 for the application of heating or cooling of the adhesive layer, which can increase the efficiency of the heating or cooling process.

Figure 13:
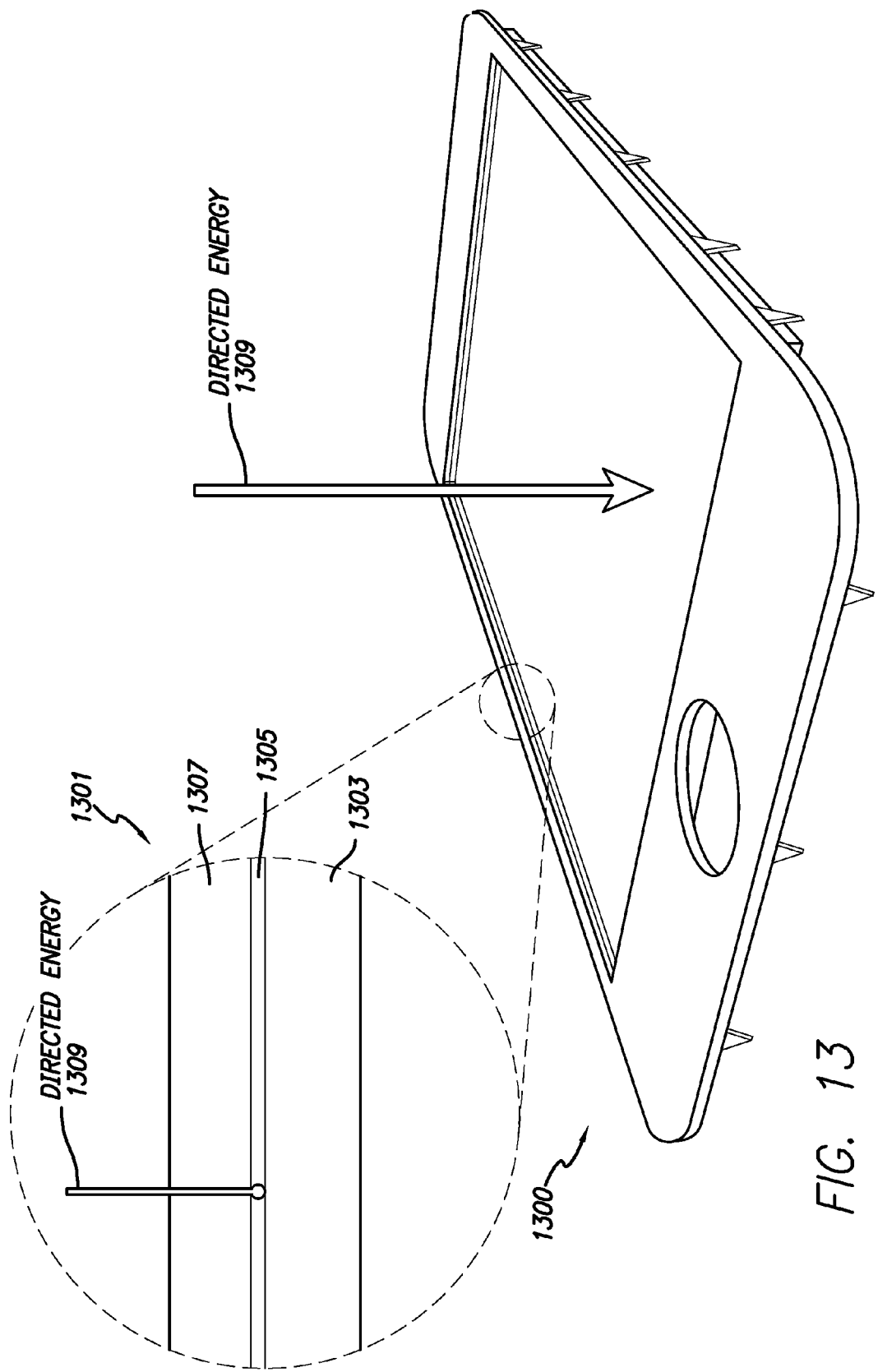
FIG. 13 illustrates another example delamination process according to embodiments of the invention.

FIG. 13 illustrates another example delamination process according to embodiments of the invention, in which an energy distribution is generated in layers of a multilayer laminated stack through selective absorption of an applied energy. FIG. 13 shows a touch screen 1300 including a multilayer laminated stack 1301 (as shown in the enlarged detail in FIG. 13). Multilayer stack 1301 includes a lower layer 1303, an adhesive layer 1305, and an upper layer 1307. During a delamination process of stack 1301, the stack is exposed to a directed energy 1309 from a localized energy transferrer. Directed energy can be, for example, EM radiation (e.g., laser light, microwaves, infrared), acoustic (e.g., ultrasonic), or other forms of energy delivered by corresponding localized energy transferrers, such as a laser, a directed microwave transmitter, an ultrasonic transducer, etc., that transmit energy absorbed primarily by a bonding layer that is desired to be weakened. For example, upper layer 1307 is designed to transmit substantially all of directed energy 1309, and adhesive layer 1305 is designed to absorb substantially all of the directed energy. The transmittance and absorbance of the layers can be highly dependent on the wavelength of the directed energy, and the design of the layers may exploit the wavelength dependence in choosing suitable combinations of layers and directed energy. The absorbed directed energy is converted to thermal energy in adhesive layer 1305. The directed energy absorbed in adhesive layer 1305 is converted to heat, resulting in a localized heating of the adhesive layer, while limiting the temperature increase of other layers in stack 1301.

In other embodiments, adhesive layer 1305 may be formulated to degrade or release under the influence of directed energy 1309.

Figure 14A:
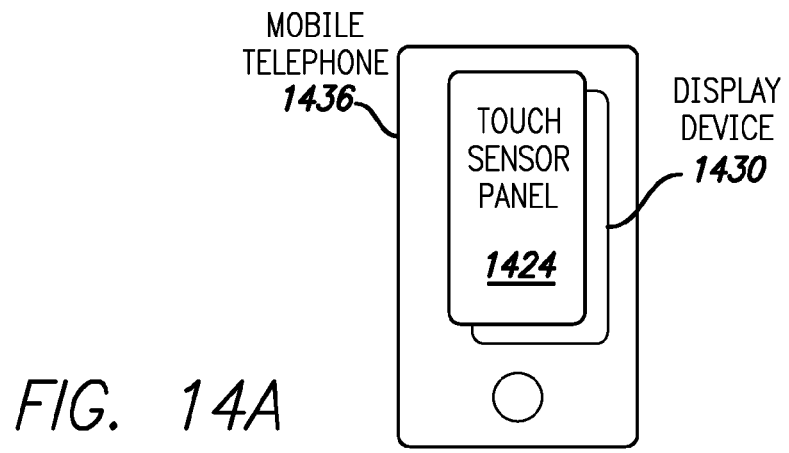
FIGS. 14A, 14B, and 14C illustrate an example mobile telephone, an example digital media player, and an example personal computer that can include a multilayer laminated stack designed to be delaminated according to embodiments of the invention.

FIG. 14A illustrates example mobile telephone 1436 that can include touch sensor panel 1424 and display device 1430, the touch sensor panel including a multilayer laminated stack designed to be delaminated according to embodiments of the invention.

Figure 14B:
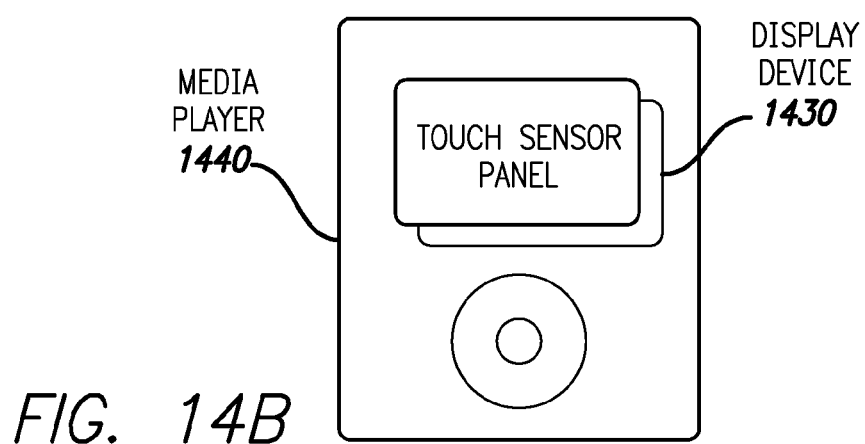

FIG. 14B illustrates example digital media player 1440 that can include touch sensor panel 1424 and display device 1430, the touch sensor panel including a multilayer laminated stack designed to be delaminated according to embodiments of the invention.

Figure 14C:
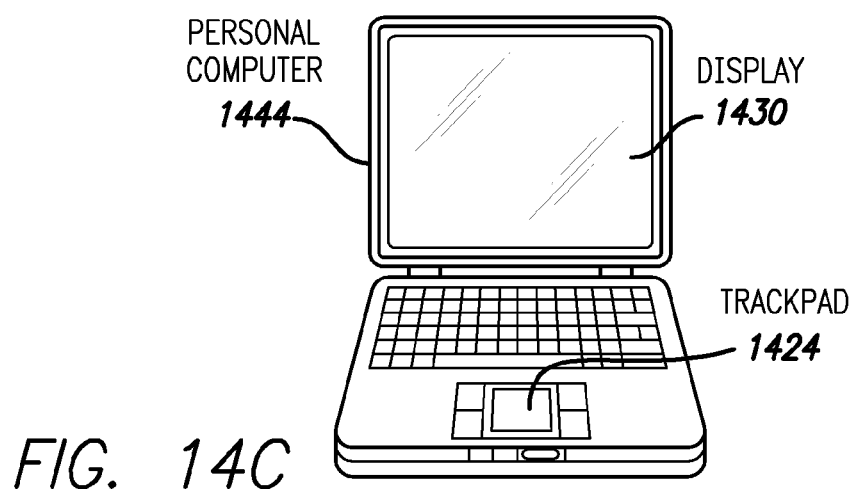

FIG. 14C illustrates example personal computer 1444 that can include touch sensor panel (trackpad) 1424 and display 1430, the touch sensor panel and/or display of the personal computer (in embodiments where the display is part of a touch screen) including a multilayer laminated stack designed to be delaminated according to embodiments of the invention. The mobile telephone, media player and personal computer of FIGS. 14A, 14B and 14C can allow a non-destructive delamination process to be performed according to embodiments of the invention.

One skilled in the art would recognize, after reading the present disclosure, that many of aspects of the invention described in individual example embodiments may be applied in the other example embodiments. For example, pulsed application of energy, which is described above in relation to the example embodiment of FIGS. 8 and 9, may be applied in other embodiments of the invention. For example, energy sources such as lasers, current sources, thermal energy sources, etc., which can be used in various embodiments of the invention, can be applied in a periodic manner, such as by pulsing the output.

Although embodiments of this invention have been fully described with reference to the accompanying drawings, it is to be noted that various changes and modifications will become apparent to those skilled in the art. Such changes and modifications are to be understood as being included within the scope of embodiments of this invention as defined by the appended claims.

What is claimed is:

1. A method of delaminating a multilayer laminated stack of overlapping layers, the method comprising:
   obtaining the multilayer laminated stack including a first layer having a first surface that extends substantially over the first layer, a second layer having a second surface that extends substantially over the second layer, and a bonding layer that bonds the first layer to the second layer, wherein the multilayer laminated stack is formed by laminating the first layer to the second layer using the bonding layer, wherein the first layer comprises a touch sensor layer and the second layer comprises a display layer;
   applying energy to a first portion of the bonding layer such that a concentration of the energy is greater in the bonding layer than a concentration of energy in the first and second layers, the bonding layer extending substantially throughout the area of overlap of the first and second surfaces, wherein the energy weakens the bonding layer at the first portion, the first portion being disposed between respective portions of the first and second surfaces;

applying a heat sink to the multilayer laminated stack to remove thermal energy from one or more of the first layer or the second layer; and breaking the weakened bonding layer at the first portion between the respective portions of the first and second surfaces.

2. The method of claim 1, wherein the first portion includes an exposed surface of the bonding layer, and applying the energy to the first portion includes applying a directed transmission of energy to the exposed surface of the bonding layer, while restricting the transmission of the energy to the first and second layers.

3. The method of claim 2, wherein applying the directed transmission of energy includes applying thermal energy to the exposed surface of the bonding layer.

4. The method of claim 3, wherein applying thermal energy includes applying a heated mechanical separation mechanism to the exposed surface.

5. The method of claim 1, wherein the first portion includes an exposed surface of the bonding layer, and applying energy to the first portion includes generating a directed transmission of energy from the exposed surface of the bonding layer, while restricting the transmission of the energy from the first and second layers.

6. The method of claim 5, wherein generating the directed transmission of energy includes removing thermal energy from the bonding layer through the exposed surface of the bonding layer.

7. The method of claim 6, wherein removing thermal energy includes applying a cooling mechanical separation mechanism to the exposed surface.

8. The method of claim 2, wherein applying the directed transmission of energy includes applying electromagnetic energy to the exposed surface of the bonding layer, while restricting exposure of the first and second layers to the electromagnetic energy.

9. The method of claim 8, wherein applying electromagnetic energy includes irradiating the exposed surface with one of (i) laser light, (ii) microwaves, and (iii) infrared radiation.

10. The method of claim 1, wherein the first portion includes an internal portion of the bonding layer, and applying the transmission of energy to the first portion includes focusing the energy transmission through the multilayer laminated stack, such that the energy transmission is less concentrated in each of the first and second layers than in the internal portion of the bonding layer.

11. The method of claim 2, wherein applying the directed transmission of energy includes transmitting the energy from a mechanical separator that breaks the weakened bond at the first portion of the bonding layer.

12. The method of claim 10, wherein focusing the energy transmission includes focusing a single beam of electromagnetic energy such that a focus of the beam is in the internal portion of the bonding layer.

13. The method of claim 10, wherein focusing the energy transmission includes aiming a plurality of beams of electromagnetic energy such that the beams converge in the internal portion of the bonding layer.

14. The method of claim 1, wherein the first layer comprises a cover glass layer.

15. The method of claim 1, wherein the second layer comprises a liquid crystal module (LCM) layer.

16. The method of claim 1, wherein the first layer comprises a cover glass layer and the second layer comprises a liquid crystal module (LCM) layer.

17. A method of removing a touch sensor layer from a laminated display stack of a portable mobile device, the method comprising:

obtaining the laminated display stack including the touch sensor layer having a first surface that extends substantially over the touch sensor layer, a display layer having a second surface that extends substantially over the display layer, and a bonding layer that bonds the touch sensor layer to the display layer and extends substantially throughout the area of overlap of the first and second surfaces;

applying energy to a first portion of the bonding layer to weaken the bonding layer at the first portion;

applying a heat sink to the laminated display stack to remove thermal energy from one or more of the touch sensor layer or the display layer; and breaking the weakened bonding layer at the first portion.

18. The method of claim 17, wherein the heat sink is attached to the display layer.

19. The method of claim 17, wherein
applying energy to the first portion includes applying thermal energy to exceed a threshold temperature that weakens the bonding layer; and
applying the heat sink maintains a temperature of the display layer below the threshold temperature.

20. The method of claim 17, wherein
applying energy to the bonding layer includes:
varying an intensity of the energy applied to the first portion over time.

21. The method of claim 17, wherein:
the applying energy to the first portion includes applying thermal energy to the bonding layer; and
applying the heat sink maintains the temperature of the display layer below a temperature that will damage the display layer.

22. A method of delaminating a laminated display stack, the method comprising:
obtaining the laminated display stack including a touch sensor layer having a first surface that extends substantially over the touch sensor layer, a display layer having a second surface that extends substantially over the display layer, and a bonding layer that bonds the touch sensor layer to the display layer and extends substantially throughout the area of overlap of the first and second surfaces;
periodically applying energy to a first portion of the bonding layer to weaken the bonding layer by switching between an on and off cycle, wherein applying the energy results in the display layer remaining below a temperature that will damage the display layer; and
breaking the weakened bonding layer at the first portion.

23. The method of claim 22, further comprising:
coupling a heat sink to the laminated display stack to remove thermal energy from one or more of: the display layer or the touch sensor layer.

24. The method of claim 22, further wherein the energy is periodically applied using a heated cutting wire.

25. The method of claim 24, wherein breaking the bonding layer is performed using the heated cutting wire.

26. The method of claim 22, wherein:
periodically applying energy to the bonding layer raises a temperature of the bonding layer above a threshold temperature that weakens the bonding layer.

27. A method of delaminating a laminated display stack, the method comprising:
- obtaining the laminated display stack including the touch sensor layer having a first surface that extends substantially over the touch sensor layer, a display layer having a second surface that extends substantially over the display layer, and a bonding layer that bonds the touch sensor layer to the display layer and extends substantially throughout the area of overlap of the first and second surfaces;
- applying energy to a first portion of the bonding layer to weaken the bonding layer by focusing an energy transmission through the laminated display stack such that the energy transmission is less concentrated in each of the touch sensor and display layers than in the bonding layer; and
- breaking the weakened bonding layer at the first portion.

28. The method of claim 27, wherein focusing the energy transmission includes focusing a single beam of electromagnetic energy such that a focus of the beam is within the bonding layer.

29. The method of claim 27, wherein focusing the energy transmission includes aiming a plurality of beams of electromagnetic energy such that the beams converge in the bonding layer.

* * * * *